(12) United States Patent
Churchill

(10) Patent No.: US 10,498,842 B2
(45) Date of Patent: Dec. 3, 2019

(54) METHODS FOR RECORDING USER INTERACTIONS WITH A WEBSITE

(71) Applicant: SessionCam Limited, Norwich (GB)

(72) Inventor: Richard Churchill, Wymondham (GB)

(73) Assignee: SessionCam Limited, Norwich (GB)

( * ) Notice: Subject to any disclaimer, the term of this patent is extended or adjusted under 35 U.S.C. 154(b) by 358 days.

(21) Appl. No.: 14/797,676

(22) Filed: Jul. 13, 2015

(65) Prior Publication Data

US 2017/0019489 A1 Jan. 19, 2017

(51) Int. Cl.
*G06F 16/954* (2019.01)
*H04L 29/08* (2006.01)
*G06F 11/34* (2006.01)
*G06Q 30/02* (2012.01)
*G06F 3/0484* (2013.01)

(52) U.S. Cl.
CPC .......... *H04L 67/22* (2013.01); *G06F 3/04842* (2013.01); *G06F 3/04847* (2013.01); *G06F 11/3476* (2013.01); *G06F 16/954* (2019.01); *G06Q 30/0201* (2013.01); *G06Q 30/0242* (2013.01); *H04L 67/025* (2013.01); *G06F 2201/865* (2013.01)

(58) Field of Classification Search
CPC ...................................................... H04L 67/22
USPC ........................................................ 715/234
See application file for complete search history.

(56) References Cited

U.S. PATENT DOCUMENTS

| | | |
|---|---|---|
| 6,192,319 B1 | 2/2001 | Simonson et al. |
| 7,941,525 B1 | 5/2011 | Yavilevich |
| 8,122,122 B1 * | 2/2012 | Clingenpeel .......... G06F 21/552 709/203 |
| 8,423,471 B1 * | 4/2013 | Emigh ................ G06F 21/6227 705/50 |
| 9,154,365 B1 * | 10/2015 | Henry ..................... H04L 67/22 |
| 9,577,889 B1 * | 2/2017 | Dumitrascu ............ H04L 67/00 |

(Continued)

FOREIGN PATENT DOCUMENTS

| | | |
|---|---|---|
| WO | WO 2011/159394 A1 | 12/2011 |
| WO | WO 2012/115981 A1 | 8/2012 |
| WO | WO 2013/137982 A1 | 9/2013 |

OTHER PUBLICATIONS

Nakajima, Amane, and Yoshinori Aoki. "Transformation of web event sequences for analysis of users' Web operation." In IEEE SMC'99 Conference Proceedings. 1999 IEEE International Conference on Systems, Man, and Cybernetics (Cat. No. 99CH37028), vol. 4, pp. 111-116. IEEE, 1999. (Year: 1999).*

*Primary Examiner* — Frank D Mills
(74) *Attorney, Agent, or Firm* — Dascenzo Intellectual Property Law, P.C.

(57) ABSTRACT

Methods for recording a session of user interaction with a website for subsequent replay comprise executing on a computer having a processor and memory the steps of receiving in the memory a webpage from the website, creating a queue of items with the processor, and storing the queue in the memory. Each item corresponds to an element of the webpage that is to be monitored for changes and comprises data entries corresponding to the current state of each of a plurality of properties for the respective element. A method of recreating a session of user interaction with a website is also provided, which involves processing batches of data generated as a result of recording a session of user interaction with a website.

22 Claims, 6 Drawing Sheets

(56) References Cited

U.S. PATENT DOCUMENTS

| | | | |
|---|---|---|---|
| 9,766,769 B1 * | 9/2017 | Webber | G06F 3/0481 |
| 2007/0050844 A1 * | 3/2007 | Lebel | G06F 11/3414 726/13 |
| 2008/0005793 A1 | 1/2008 | Wenig et al. | |
| 2009/0063968 A1 | 3/2009 | Wenig et al. | |
| 2009/0125496 A1 | 5/2009 | Wexler et al. | |
| 2009/0125532 A1 | 5/2009 | Wexler et al. | |
| 2010/0042573 A1 | 2/2010 | Wenig et al. | |
| 2010/0095208 A1 * | 4/2010 | White | G06F 17/30905 715/704 |
| 2010/0174774 A1 | 7/2010 | Kern et al. | |
| 2010/0251128 A1 | 9/2010 | Cordasco | |
| 2010/0257440 A1 * | 10/2010 | Kshirsagar | G06F 17/30896 715/230 |
| 2011/0029665 A1 | 2/2011 | Wenig et al. | |
| 2011/0173239 A1 | 7/2011 | Sayed et al. | |
| 2011/0191676 A1 * | 8/2011 | Guttman | G06F 3/00 715/716 |
| 2011/0213822 A1 | 9/2011 | Yavilevich | |
| 2011/0246879 A1 * | 10/2011 | White | G06F 17/3089 715/704 |
| 2011/0313800 A1 | 12/2011 | Cohen et al. | |
| 2011/0320880 A1 | 12/2011 | Wenig et al. | |
| 2012/0084437 A1 | 4/2012 | Wenig et al. | |
| 2012/0102101 A1 | 4/2012 | Wenig et al. | |
| 2012/0151329 A1 | 6/2012 | Cordasco | |
| 2012/0173966 A1 | 7/2012 | Powell et al. | |
| 2013/0091417 A1 | 4/2013 | Cordasco | |
| 2013/0132833 A1 * | 5/2013 | White | G06F 3/048 715/704 |
| 2013/0339428 A1 | 12/2013 | Wenig et al. | |
| 2013/0342538 A1 | 12/2013 | Kozine et al. | |
| 2014/0108115 A1 | 4/2014 | White et al. | |
| 2014/0108911 A1 | 4/2014 | Damale | |
| 2014/0137052 A1 * | 5/2014 | Hernandez | G06F 9/4443 715/863 |
| 2014/0143652 A1 | 5/2014 | DeLoach et al. | |
| 2014/0208200 A1 | 7/2014 | Powell et al. | |
| 2014/0280517 A1 | 9/2014 | White et al. | |
| 2015/0058616 A1 | 2/2015 | Wenig et al. | |
| 2016/0191351 A1 * | 6/2016 | Smith | H04L 43/062 709/219 |

\* cited by examiner

METHODS FOR RECORDING USER INTERACTIONS WITH A WEBSITE

FIELD OF THE DISCLOSURE

The present disclosure relates to methods for recording user interactions with a website. More particularly, it is concerned with recording user interactions to enable a user's web session to be replayed remotely in an accurate manner.

BACKGROUND TO THE DISCLOSURE

It is of considerable value to a company with an online presence to be able to monitor and understand the interaction of users with their webpages. Often websites guide visitors through a series of pages through to purchase points. Measurement and analysis of the progress of users through these processes with a view to increasing the rate of successful completion can lead to increased revenue.

The ability to quickly identify where users encounter problems means that the development of correcting measures can be expedited, minimising the risk of lost sales and the level of frustration felt by the users. The impact of any problems encountered by website users on a company's reputation, market position and its customer support processes can thereby be reduced.

Known implementations of user monitoring generally fall into two main categories, namely client-side browser implementations and server-side "network sniffers". However, existing methods tend to be of limited accuracy and unable to cover the wide range of scenarios that regularly occur in interaction with modern web sites. Accordingly, these known techniques have been found to record user interactions with insufficient detail and accuracy to enable close replication of a user's web session.

SUMMARY OF THE DISCLOSURE

The present disclosure provides a method for recording a session of user interaction with a website for subsequent replay. The method comprises executing on a computer having a processor and memory the steps of receiving in the memory a webpage from the website, creating a queue of items with the processor, each item corresponding to an element of the webpage that is to be monitored for changes, wherein each item comprises data corresponding to the current state of at least one property for the respective element, and storing the queue in the memory.

In this way, a data structure in the form of a queue is built which facilitates accurate identification of changes to elements of the webpage over time. It provides a basis for efficient detection and collation of changes to elements of the webpage.

Also disclosed are systems, devices, and software associated with the present methods.

BRIEF DESCRIPTION OF THE DRAWINGS

Embodiments according to the present disclosure will now be described by way of example and with reference to the accompanying schematic drawings, wherein.

DETAILED DESCRIPTION AND BEST MODE OF THE DISCLOSURE

Figure 1:
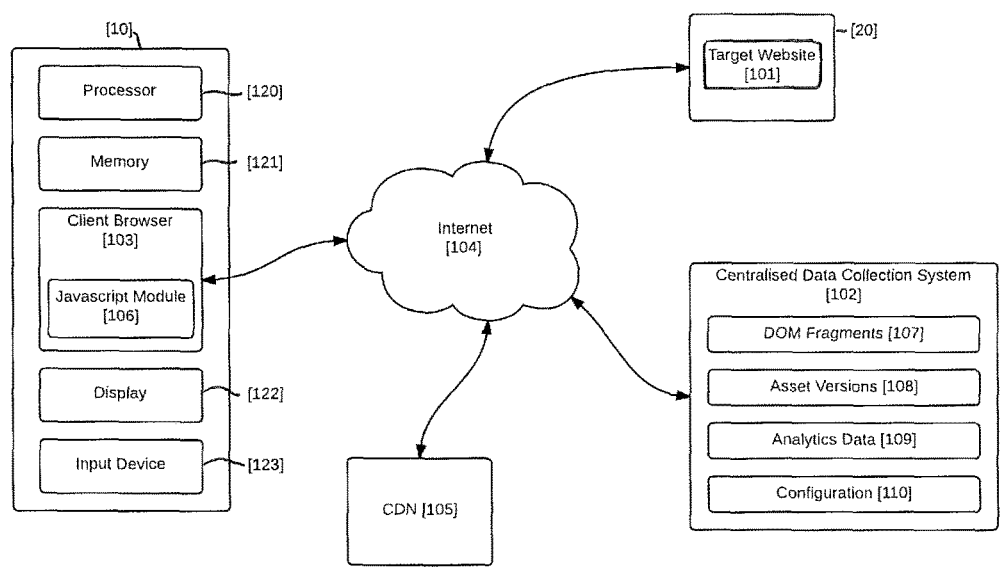
FIG. 1 is a block diagram of a network architecture for use according to the present disclosure.

The present disclosure provides a method for recording a session of user interaction with a website for subsequent replay. The method comprises executing on a computer having a processor and memory the steps of receiving in the memory a webpage from the website, creating a queue of items with the processor, each item corresponding to an element of the webpage that is to be monitored for changes, wherein each item comprises data corresponding to the current state of at least one property for the respective element, and storing the queue in the memory.

In this way, a data structure in the form of a queue is built which facilitates accurate identification of changes to elements of the webpage over time. It provides a basis for efficient detection and collation of changes to elements of the webpage.

The method may include the steps of creating a record of the webpage as initially rendered on a display screen of the computer, and storing the record in the memory.

This provides an accurate starting point for subsequent recreation and replaying of a session. The record comprises data which can be used to recreate the webpage as seen by the user. It may capture a Document Object Model (DOM) used to render the webpage. The record may comprise a serialisation of the webpage or DOM, such as a text serialisation.

In embodiments, the step of creating a queue excludes from the queue the elements of the webpage that are below a predetermined level in the structure of the webpage. This means that the process of monitoring for changes is primarily concentrated on sections of a webpage that are likely to involve a high frequency of change. This serves to optimise the accuracy and efficiency of change capture for a given level of workload, to minimise any impact on the browser operation.

The predetermined level in the structure of the webpage down to which elements are included in the queue may correspond to the level of an input field. The level at which input fields are normally included in a webpage has been found to be the lowest level where frequent change is likely to happen.

Where elements below a predetermined level are excluded from inclusion in the queue, the method may include a step of creating a record of elements below the predetermined level as rendered on the display screen of the computer. Areas of the webpage that are likely to change infrequently are thereby efficiently captured.

The at least one property may comprise whether the element of the webpage is visible to the user according to its current state.

Accordingly, only changes associated with visible elements of the webpage may be checked for and captured which considerably improves the efficiency of the monitoring process.

The at least one property of each element that is included in the corresponding item in the queue may be the location of the element in the webpage. Recording the position of each element in the page relative to the others enables the position of elements to be accurately noted and recorded together with an associated change. This overcomes problems that may be encountered with websites that do not have well-built mark-up.

The location of the element may be in the form of an xpath statement. This type of notation is able to uniquely identify the location of an element relative to other elements of the webpage.

Embodiments of the method include the steps of retrieving each item of the queue from the memory, comparing the data of the item with the current state of the at least one property for the respective element, and storing in the memory any changes to the properties of the element which are identified in the comparing step.

In this way, the elements of the webpage selected for inclusion in the queue may be checked for any changes which are then stored. This allows fine-grained changes to be identified on an element by element basis within the webpage. Utilisation of the queue structure based approach allows the process of identifying changes to be distributed over time which provides accuracy whilst controlling use of the resources of the browser.

The changes to elements of the webpage may be stored in the cache of the browser being used to view the webpage for example. Storage of the changes locally in this manner (rather than on a server at another location) serves to increase the speed of the recording process.

The process of storing changes may include storing a parameter in association with each change, which parameter is dependent on the time that has elapsed between the start of the session and the time at which the change was identified. Accordingly, the timing of a change can be accurately reproduced during the replay of a session.

The method may include the steps of identifying a new element in the webpage which does not have a corresponding item in the queue, creating a new item corresponding to the new element, adding the new item to the queue, and may include a further step of creating a record of the new element as rendered on the display screen of the computer.

The queue is thereby updated to include any elements added to the webpage that are to be individually checked. This process may include identifying any child elements associated with the new element and adding items corresponding to the child elements to the queue. The addition of the child elements may be subject to checking that the child elements are not below the lowest level of the webpage that is to be itemised in the queue. Subsidiary elements associated with the new element may be captured and added to the queue for subsequent checking for changes.

Embodiments of the method may include the step of storing in the memory a HEAD item comprising data corresponding to the current state of at least one property of the HEAD section of the webpage. If the HEAD section has one or more child elements associated with it, the method may include a further step of storing data in the memory corresponding to the current state of at least one property of each of these child elements.

Monitoring of the HEAD section of the webpage increases the accuracy of replay of a session as the HEAD can have a significant influence over how a webpage is rendered by a browser. Therefore, the method may include, after all items in the queue have been retrieved from the memory and checked for changes, the steps of retrieving the HEAD item from the memory, comparing the data of the HEAD item with the current state of each of the at least one property for the HEAD section of the webpage, and storing any changes to the HEAD item identified in the comparing step in the memory.

The HEAD section may be monitored separately from the elements in the BODY of the webpage. It is advantageous to prioritise the monitoring of the elements of the BODY and so this may be checked before the HEAD section for any changes.

A monitoring method according to the present disclosure may include the steps of identifying an asset in the webpage that is obtained by the webpage from another network location, and storing location data corresponding to said network location in the memory.

Capturing the network location of an asset in the webpage facilitates the retrieval and storage of a current version of the asset for use in subsequent replay of a session.

The method may include the steps of detecting at least one of a user input corresponding to a change in the position of a mouse pointer and a keystroke, and storing a record of the user input in the memory.

User inputs may thereby be captured along with other changes to facilitate accurate replay of a user's interaction with the webpage.

Further embodiments may include the steps of retrieving from the memory and outputting from the processor a batch of the stored changes to elements, transmitting the batch to a remote computer, and outputting after a delay time a next batch for transmission to the remote computer.

Transmission of stored changes, possibly together with data corresponding to captured user inputs and/or asset locations, is carried out in a batched manner. In this way, relatively small packets of data may be transmitted on a frequent basis to reduce any impact on the bandwidth provided by a user's network connection.

The recording methods of embodiments described herein facilitate accurate recording of a web session without materially impeding the user's interaction with the website, whilst facilitating accurate playback of the session for subsequent analysis.

According to another aspect, the present disclosure provides a method of initiating recording of a session of user interaction with a website for subsequent replay, comprising sending instructions to a computer to cause it to carry out a recording method as defined herein.

According to another aspect, the present disclosure provides a method of recreating a session of user interaction with a website, comprising executing on a computer having a processor and memory the steps of retrieving the batches transmitted by a computer carrying out a recording method as described herein, storing the batches in the memory, and processing the batches with the processor to recreate the session for replay on a display device.

The processing of the batches to recreate the session may be carried out in advance of a request to replay the session or on demand, that is, in response to a request to replay the session. The processing may generate a record of the session in a multimedia file format for example. The processing to recreate a session may be carried out "in line" with recording, that is, soon after receipt of the recording data so that the recreation of the session is ready to be used for playback at an early stage.

A computer network for implementation of embodiments of the present disclosure is shown in FIG. 1. A number of computer systems at different locations are communicatively coupled together via an external network such as the Internet 104. A data collection system 102 is remote from the website server 20 with which a user interacts. Program instructions, in the form of JavaScript for example, for implementing a recording method are delivered by a content delivery network (CDN) 105. The user accesses the target website 101 on server 20 using a browser 103 on the user's own computing device 10 via the Internet 104. Computing device 10 has a processor 120 and memory 121.

Processor 120 serves to run instructions that may be loaded into memory 121. Processor 120 may be a number of processors, a multi-processor core, or some other type of processor, depending on the particular implementation. Further, processor 120 may be implemented using a number of heterogeneous processor systems in which a main processor is present with secondary processors on a single chip. As another illustrative example, processor 120 may be a symmetric multi-processor system containing multiple processors of the same type.

Memory 121 is any piece of hardware that is capable of storing information, such as, for example, without limitation, data, program code in functional form, and other suitable information either on a temporary basis or a permanent basis. Memory 121, in these examples, may be, for example, a random access memory or any other suitable volatile or non-volatile storage device.

When the user views a webpage of the website 101 on the server 20, this causes program instructions to be delivered from the CDN 105 to the user's computing device 10, installing the recording tool on the device. This may be in the form of a JavaScript module 106.

During the user's web session, data is collected by the JavaScript module which records the user's interaction with the website and the data is transferred to the data collection system 102. This data is processed and saved by the data collection system into a selection of data stores and indexed ready for retrieval when the web session is to be replayed. The stored data may comprise entries associated with elements of the webpage (denoted as "DOM Fragments" 107 in FIG. 1), versions 108 of assets present in the webpage, analytics data 109 (that is data corresponding to recorded events such as entries into input fields, mouse activity, keystrokes, DOM changes and interaction with links between webpages) and information 110 about the configuration of the webpage. Communication between the JavaScript module and the data collection system occurs at regular intervals to ensure accurate tracking of the session until the user leaves the website in question.

According to embodiments of the disclosure, a recording method is provided which captures the starting state of a webpage and then employs asynchronous monitoring of changes using a queue system which is maintained throughout the session to capture changes to elements, addition to and removal of elements of the webpage being monitored.

Assets incorporated in the webpage may be obtained from many different geographical locations in the Internet 104. Current versions of assets used in the webpage are captured and stored in the data collection system 102 to ensure that the look and feel of the web session is accurately recorded for replay, irrespective of where the assets are located in the Internet.

Steps in a process for recording user interaction with a website according to an embodiment of the disclosure will now be described with reference to the flowchart of FIG. 2.

The process is initiated in step 200 when a user requests a webpage using a web browser running on a computing device 10 such as a desktop PC or mobile device. Alternatively, the user may use a client application such as a mobile device app or other desktop software for example.

In response to the user request, the target website server then transmits the requested webpage to the client's device (step 201). Recording code delivered from CDN 105 is downloaded to the client device as part of the webpage.

The webpage is then rendered for viewing on a display 122 of the client's device in step 202. This may involve downloading assets which form part of the webpage from the Internet to the client device. The web browser on the client device then executes the recording code in step 203.

As an initial step, the recording code makes a request to the data collection system 102 for configuration information relating to its current context. This involves providing the core system with a list of details that describe the environment that the recording code is initialising in.

The request may include a url that uniquely identifies the website being viewed, and a data string that identifies the application being used to view the website. The request may be communicated in a number of ways, for example using the JSONP technique.

In response to the request, the data collection system 102 sends configuration data which dictates how the recording code should be executed in the current circumstances. This may comprise information relating to a sensitive data policy associated with the website, exclusions (for example identifying areas of a website that are not to be recorded, or fields to be excluded from recording, such as data entries which are masked on the screen), DOM monitoring settings, custom JavaScript to execute, a custom page name, recording settings (such as whether to record a session being carried out on a mobile device and whether user gestures are to be recorded), and/or other monitoring policy parameters relating to the website and whether recording should begin.

A check is made in step 204*a* that recording of a web session should begin by referring to the configuration data received from the central data collection system. Recording may not be required for excluded areas of a website or where only a proportion of sessions are to be recorded, for example.

The recording begins in step 205 by making a record of the initial state of the webpage as rendered in the user's browser. This is taken from the Document Object Model (DOM) to provide an accurate starting point for replaying user interactions or events captured during the session. This record (which may be in the form of a serialisation of the DOM) is then transmitted to the data collection system 102.

Some embodiments may use caching based on a hashing mechanism to reduce the amount of bandwidth used to send the record of the initial state of the webpage being viewed. This mechanism may also be applied to some or all of the change data. Suitable hash functions may be MD5 or SHA for example.

In some circumstances, the presence of hashing mechanisms may hinder performance or be of negligible benefit due to the volume of rendering permutations encountered across webpages and websites. In these cases, the use of hashing mechanisms may be omitted.

In step 206, listeners (or other event based triggers) are attached to browser events to capture activity from user input devices 123 such as a mouse, a touch sensitive screen, a touchpad, and/or a keyboard for example. This enables user events to be synchronised to other changes occurring on the webpage within the same time window for replication in a subsequent replay of the web session.

A change monitoring or "DOM-monitoring" module is attached to the webpage in step 207. This involves preparing elements of the webpage for monitoring and this is discussed in more detail with reference to FIGS. 3, 5 and 6 below.

In step 208, the webpage is periodically checked for changes. Data corresponding to changes is captured by the user event listeners and the DOM-monitoring process. This data is stored in a local browser cache. Mechanisms such as DOM buffers, local storage and serialisation of data attributes may be used to store the change data in memory until the data is transmitted back to the data collection system 102. The changes that are identified may be stored in an event queue, ready to be prepared for transmission to the data collection system 102. The processes involved in step 208 are discussed in more detail below with reference to FIGS. 4 to 6.

The stored change data is packaged ready for transmission back to the recording server on a regular basis in step 209. Such packaging may include known compression techniques, substitutions (such as encoding to ensure that data reaches its destination unaffected by techniques such as serialisation and compression), and removal of unwanted data such as repeated whitespace. Data packages may be prioritised based on the relative importance of their contents.

Batching of change data into change sets reduces the bandwidth required for the recording process. In this way, relatively small packets of data may be transmitted back to the data collection system on a frequent basis. Compression and removal of common elements, such as duplicated white space, invisible sections of a webpage and frequently seen structures optimises the use of bandwidth for transmitting change data that increases the accuracy of replay of the session. The impact of the recording process on the speed of the web browser is also minimised by packaging the analysis of changes into smaller pieces.

In step 210, the data collection system checks received change data for assets that have a visible effect on the webpage when it is rendered. These may include but are not limited to Cascading Style Sheets (CSS), images and fonts. The network locations of these assets are passed to an asset versioning subsystem of the data collection system which is responsible for downloading and storing current versions of the assets as necessary, ensuring accuracy of replay as the look and feel of the recorded resource changes over time.

Figure 2:
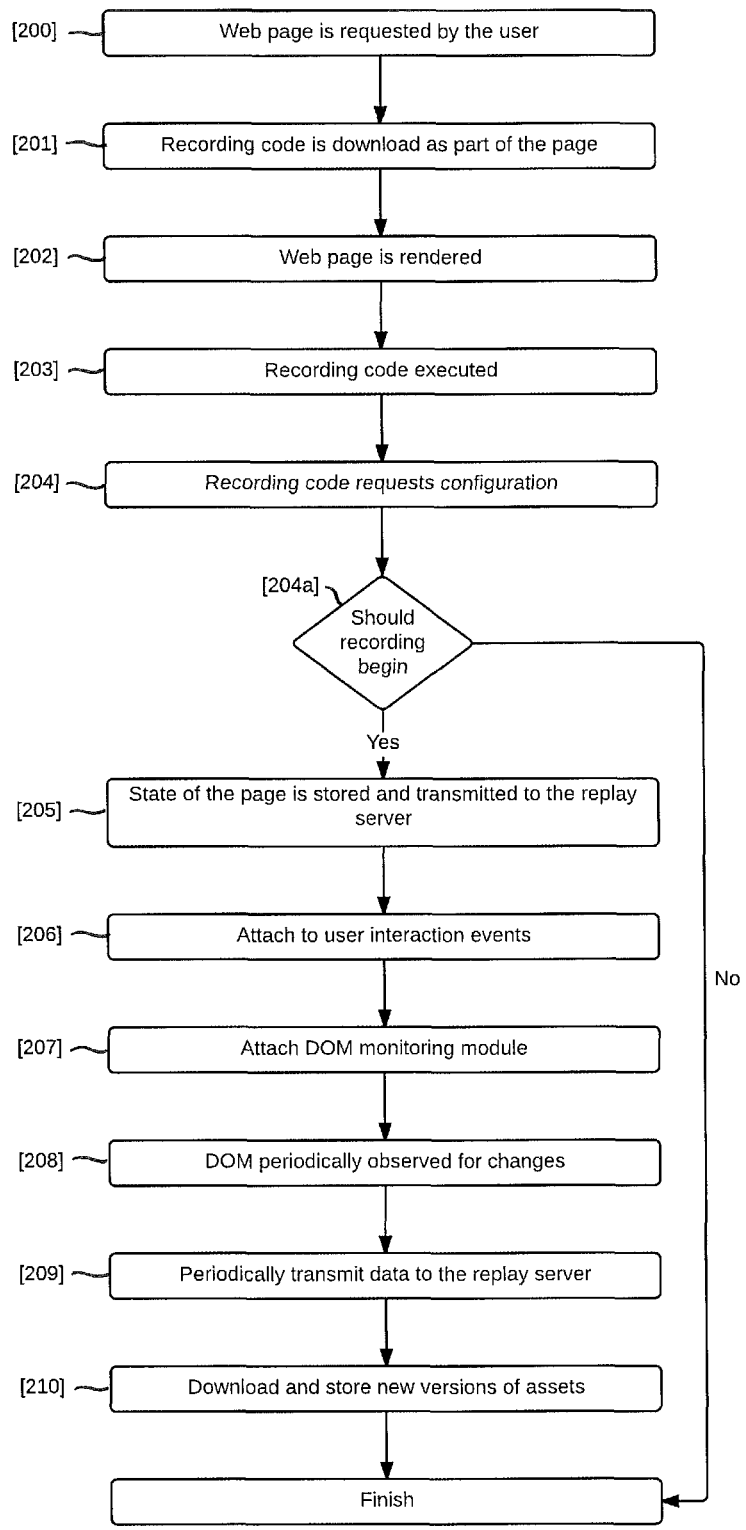
FIG. 2 is a flowchart illustrating recording of a web session according to the present disclosure.
Figure 3:
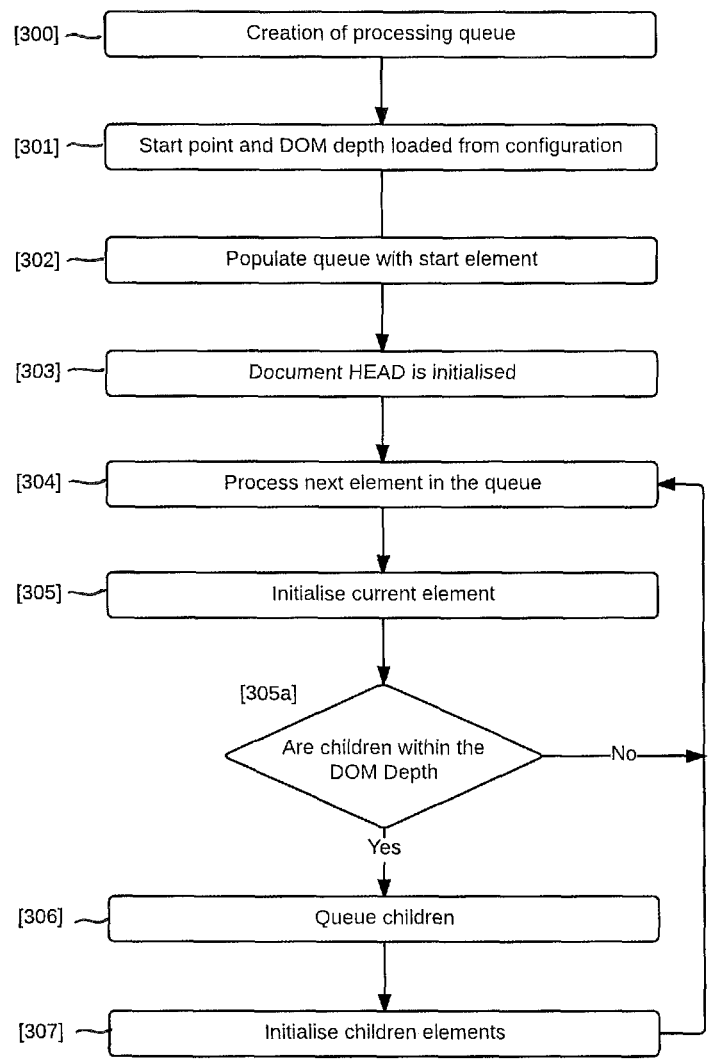
FIG. 3 is a flowchart illustrating generation of a queue according to the present disclosure.

FIG. 3 shows a flowchart which sets out in more detail steps involved in preparing for monitoring of a webpage, corresponding to step 207 in FIG. 2.

In the process illustrated in FIG. 3, the initial state of certain elements of the webpage is recorded at an early opportunity in the page load cycle. This initial state is then ready for comparison with later states of the webpage in order to identify any changes.

In step 300, structures used by the monitoring process are constructed, such as the DOM queue. The DOM queue holds a list of the webpage elements that are to be processed during each iteration of monitoring of the webpage for changes. The use of a queue enables the various different parts of a webpage to be checked efficiently whilst enabling change data to be collated and transferred to a central collection system in a resource-efficient manner.

Each item in the queue corresponds to an element of the webpage and comprises data entries corresponding to the current state of each of a plurality of properties of the respective element. These properties may include for example whether or not the element is visible in the webpage when rendered by a browser, the location of the element on the webpage, whether it has any child elements associated with it (and if so it may include data identifying each child), a value associated with the element, any text before or after the element, a unique ID number for the element (which may have been associated in the webpage with the element, but may be generated by the recording code to ensure that each element is uniquely identifiable by its ID number), and/or any other element properties such as inner HTML, class, title, style src, alt and the like.

In the case of an item in the queue corresponding to a parent element, that is an element which has child elements associated with it, the data entries associated with the parent element may include entries which identify the child elements and the order in which they are seen on the webpage.

In step 301, the start point and DOM depth are loaded from the configuration data received from the data collection system 102. The start point identifies the element in the webpage at which analysis of the webpage to generate the queue is to start. The DOM depth corresponds to the depth into the levels of the webpage to which elements are to be identified and added to the queue. These settings define the boundaries for granular comparison across a structure of the webpage. Often, the start point will be the document BODY element, but in some cases it may only be necessary to detect changes in certain focussed areas of the webpage.

The DOM depth may for example correspond to the lowest element in a webpage where frequent change is likely to happen, such as INPUT fields. The ability to tailor the DOM depth for a particular webpage provides flexibility and greater efficiency. A default level may be used for the DOM depth. Alternatively, the recording code may determine the appropriate depth for a given page by monitoring iteration speed and/or the frequency of change in different areas of the webpage.

In step 302, an item corresponding to the element where monitoring is to begin (the start point, such as the document BODY element for example) is pushed into the queue.

In step 303, the document HEAD is initialised. The document HEAD is a section of the webpage structure that contains information about the page for the purpose of displaying it correctly. For example the document title, metadata, linked files to help display the document as intended, and behaviour are examples of information likely to be in the document HEAD. Although the HEAD itself may not be visible when viewing a webpage in a web browser, it has been found to be advantageous to record the state of the HEAD and monitor it for changes. For example the document style may be changed in response to a user's interaction with a webpage. By monitoring the head, it is possible to capture these changes and thereby improve the accuracy of playback of a web session.

Steps 304 to 307 represent an iterative process for adding items corresponding to other webpage elements to the queue. "Initialising" an element involves adding an item to the queue corresponding to the element to record the current state of an element for subsequent comparison. A set of data entries is associated with each element.

Each element checked for addition to the queue is examined to see if it can have properties assigned. In some cases, elements will not support property assignment or do not need to. In these instances, the element will not be added to the queue. Incompatible page elements may include for example OBJECT, SCRIPT, #COMMENT, #TEXT, LINK, and STYLE elements.

If an element is to be added to the queue, it is processed and details of its properties are added to the queue in steps 304 and 305.

In step 305*a*, the element to be analysed is checked for any child elements. If any are found, those child elements are checked to see if they are within the DOM depth. If no children are identified that are within the DOM depth, the process moves on to the next element for checking. Any associated child elements that are within the DOM depth are added to the queue in step 306 and associated properties included in step 307.

In step 306, where SELECTs are identified, only the selected value is stored as they can often have large numbers of children that do not need to be individually tracked for changes.

Figure 4:
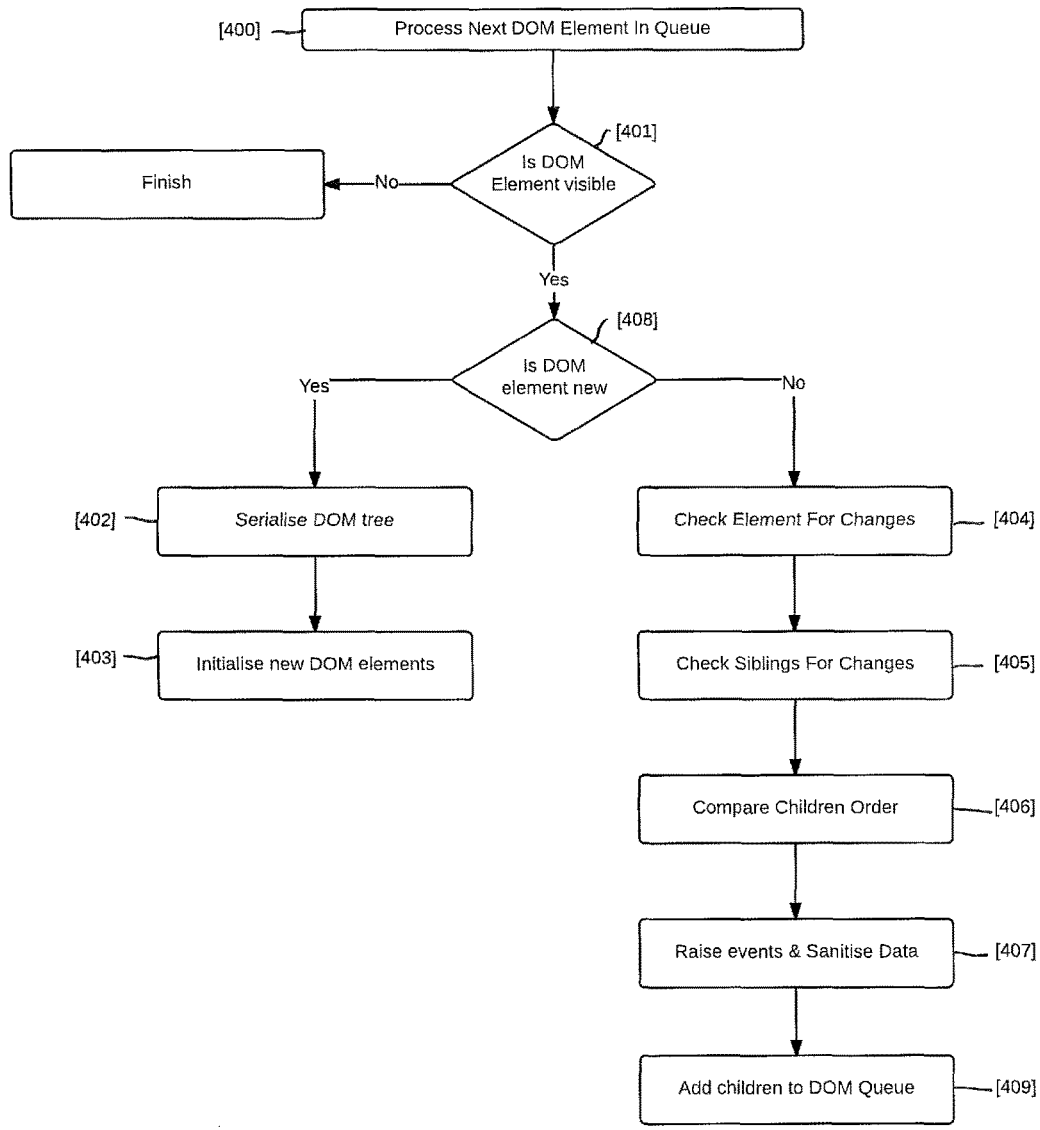
FIG. 4 is a flowchart illustrating monitoring of a webpage.

The state of the webpage is then monitored periodically by systematically checking each item in the queue against the current state of the corresponding element in the webpage. The steps involved in analysing an element are shown in FIG. 4.

In initial step 401, a check is made as to whether the element is visible in the webpage in the form rendered for viewing by a user. If not, the element is retained in the queue, but is not processed further. If the element is visible, the process moves onto step 408.

Where it is detected that the state of an element has changed from invisible to visible, the element and any associated child elements are treated as new in step 408. In that event, a "serialisation" for the element and all of its children is captured (that is a record created corresponding to a snapshot of how the element and its children are rendered in memory by the browser) in step 402 and the record is stored ready for transmission to the data collection system at the appropriate time. Data entries corresponding to the current state of the new element and its child elements are added to the queue in step 403.

In checking an element that continues to be visible (step 404), the data entries stored in the queue for that item are checked against the current state of the element and any changes are stored ready for transmission to the data collection system. Sibling text elements may be checked (in step 405) for any changes to detect insertion of elements between adjacent blocks of text.

The order of sibling child elements is checked (in step 406) to ascertain whether any elements have been added, moved or removed. Such changes may be caused by browser operation or enacted by behaviour of the website or the user. Where appropriate, the items in the queue corresponding to the child elements are updated to reflect the new order.

Sensitive data (such as information personal to the user) may be removed from any data to be transmitted to the data collection system (in step 407), in accordance with configuration data initially received from the data collection system 102 in connection with the website concerned. Changes and events are packaged and queued to the browser cache (in step 407) ready for transmission to the central data collection system.

The element is checked for any new child elements. If any are identified, they are added to the queue in step 409. A record of how the element is rendered for viewing may be taken (such as a serialisation) at this stage, and details of the properties of the element are noted (that is, the element is "initialised") during the next iteration through the queue. Delaying the initialisation step until the next iteration may be beneficial for performance reasons.

Figure 5:
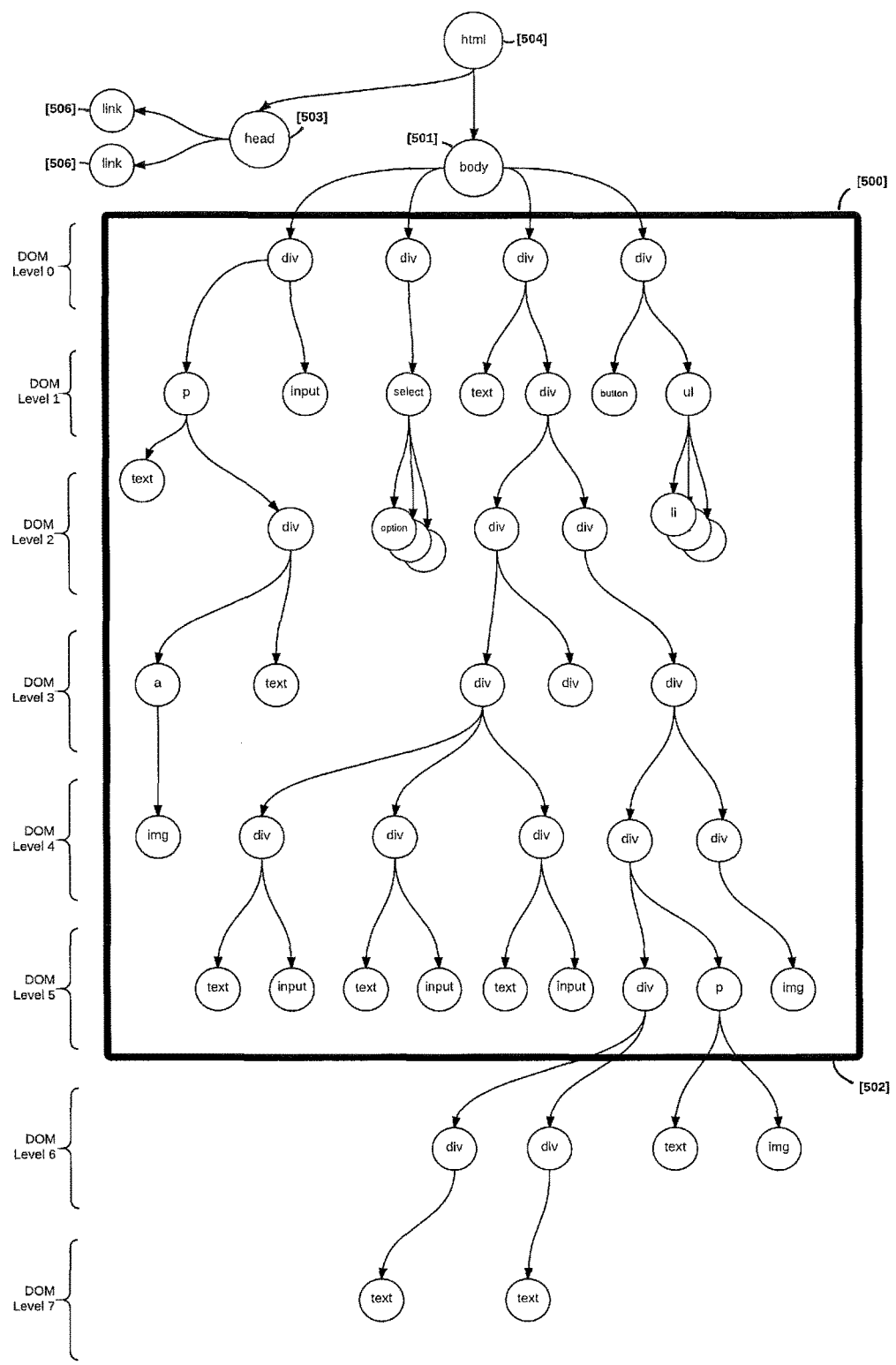
FIG. 5 illustrates an example of a webpage structure to be monitored according to the present disclosure.

An example of a webpage structure is depicted in FIG. 5 for illustrative purposes.

The highest level element 504 or root node of the page is denoted "html". Linked to the root node are the document HEAD 503 and BODY 501. The HEAD may for example include links 506 to files used in determining how to display the webpage.

Elements forming the webpage itself cascade in a series of levels (labelled as DOM levels 0 to 7 in FIG. 5). Those elements linked directly to the BODY form level 0. The child elements of the elements in level 0 are in level 1, and so on.

In FIG. 5 by way of example, "p" denotes a paragraph, "div" a divider, "input" a form field, "select" a dropdown menu, "ul" an unordered list, "li" a list item, and "a" a link.

In some instances, as discussed above, not every element of a webpage may need to be checked for detailed changes, to reduce the resource requirements of the checking process or focus the checking on an area of high frequency changes in the webpage. A maximum depth of detailed checking may be defined which corresponds to a level of the webpage. This is illustrated in FIG. 5 by a "virtual container" 500, which limits the detailed checking to levels 0 to 5. The virtual container is placed over the webpage structure and constrains the monitoring to only a certain section of the page. In the example of FIG. 5, it can be seen that the input fields are located in the container, above level 6.

For elements within the container, the change recording process identifies any changes in detail, such as changes to element placement and attribute values, to generate change data. The states of child elements below the bottom edge 502 of the container are captured as a snapshot of how those elements are rendered by the browser. This is faster than carrying out detailed checking for changes for each of these elements. The use of virtual container enables a balance to be found between processing demands and bandwidth on the one hand and monitoring for changes to a high degree of accuracy on any webpage on the other.

Each iteration of detailed checking, that is each run through the items in the queue, is initiated using a timer. The time between each iteration may be of the order of 200-300 ms for example.

When a change is detected, the position of the changed element may be recorded using an xpath statement. This uniquely locates the element relative to other elements in the webpage at the point in time concerned.

The changes may be caused by user interactions with the webpage, by the website itself or by interaction with other software for example.

The document HEAD 503 may be monitored separately to the BODY 501 of the webpage. The document HEAD may be checked for changes inbetween successive iterations of monitoring of the BODY. The monitoring of the HEAD may be triggered according to a timer that is started when processing of the queue in a given iteration has been completed, in order to prioritise monitoring of the BODY. When the HEAD is checked, the presence and order of style sheets may be observed and recorded. The insertion, removal and order of the styles may be recorded and compared during checking. Any class and styles associated with the root node 504 may also be checked during the HEAD monitoring process.

The use of a queue structure in the recording process enables the process to be interleaved with other operations occurring as a result of the user's interaction and other behaviour working within the website, whilst capturing changes in an accurate and reliable manner.

Processing of a webpage to generate the queue element by element may be broken down by allowing small time gaps between processing of each element or groups of elements. These time gaps allow other activity on the webpage to occur and allow the webpage to perform its normal activity whilst properties of the elements are recorded in detail, without noticeably interrupting the user experience.

Figure 6:
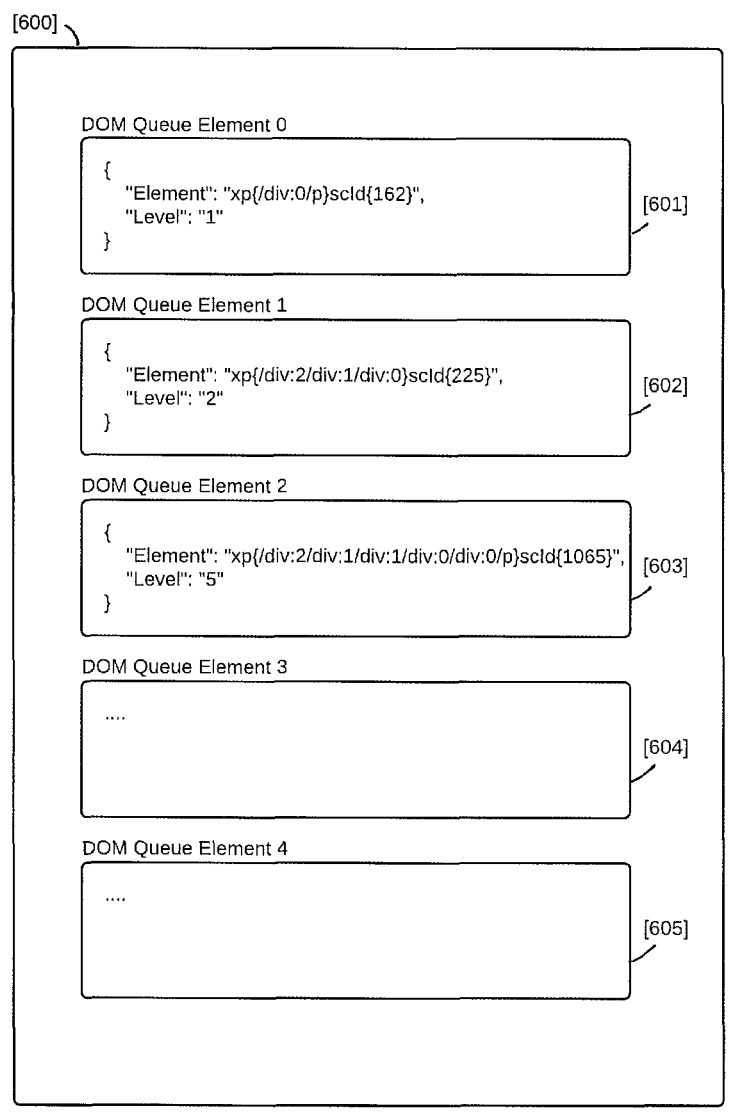
FIG. 6 is a diagram illustrating the structure of a queue constructed according to the present disclosure.

The structure of a queue according to the present disclosure is illustrated in FIG. 6 by way of example. Only the first five items 601 to 605 in the queue 600 are shown for the purposes of illustration. Each item corresponds to an element of the webpage which is to be checked by the recording process for detailed changes. The queue exists in memory on the web browser as a structure that holds a reference to the element in question and its level within the webpage. In FIG. 6, the location of each element is also shown as an xpath statement. An "scId" is associated with each element which is an ID number unique to each element and is generated by the recording code during the initialisation process for that element.

During the process of checking a webpage for changes, each element in the queue is considered in turn and compared with the current state of the element in the webpage. When new elements are identified during checking, they are added to the queue for subsequent monitoring.

The following enumerated paragraphs represent illustrative, non-exclusive ways of describing inventions according to the present disclosure.

A. A method for recording a session of user interaction with a website for subsequent replay, comprising executing on a computer having a processor and memory the steps of:

receiving in the memory a webpage from the website;

creating a queue of items with the processor, each item corresponding to an element of the webpage that is to be monitored for changes, wherein each item comprises data corresponding to the current state of at least one property for the respective element; and storing the queue in the memory.

A1. The method of paragraph A, including the steps of:

creating a record of the webpage as initially rendered for display on a display device by the computer; and storing the record in the memory.

A2. The method of paragraph A or A1, wherein the step of creating a queue excludes the elements of the webpage that are below a predetermined level in the structure of the webpage.

A2.1. The method of paragraph A2, wherein the predetermined level corresponds to the level of an input field in the webpage.

A2.2. The method of paragraph A2 or A2.1, including a step of:

creating a record of elements below the predetermined level as rendered on a display screen of the computer.

A3. The method of any of paragraphs A to A2.2, wherein the at least one property comprises whether the element of the webpage is visible to a user according to its current state.

A4. The method of any of paragraphs A to A3, wherein the at least one property comprises the location of the element in the webpage.

A4.1. The method of paragraph A4, wherein the location of the element is in the form of an xpath statement.

A5. The method of any of paragraphs A to A4.1, including the steps of:

retrieving each item of the queue from the memory;

comparing the data of the item with the current state of the at least one property for the respective element; and storing any changes to the element identified in the comparing step in the memory.

A5.1. The method of paragraph 5, wherein the changes are stored in a cache of a browser being used to view the webpage.

A5.2. The method of paragraph A5 or A5.1, including the step of:

storing a parameter in association with each change, which parameter is dependent on the time elapsed between the start of the session and the time at which the change was identified.

A5.3. The method of any of paragraphs A5 to A5.2, including the steps of:

retrieving from the memory and outputting from the processor a batch of the stored changes to elements;

transmitting the batch to a remote computer; and outputting after a delay time a next batch for transmission to the remote computer.

A6. The method of any of paragraphs A to A5.2, including the steps of:

identifying a new element in the webpage which does not have a corresponding item in the queue;

creating a new item corresponding to the new element;

adding the new item to the queue; and creating a record of the new element as rendered on a display screen of the computer.

A6.1. The method of paragraph A6, including the steps of:

identifying a child element associated with the new element; and adding an item corresponding to the child element to the queue.

A7. The method of any of paragraphs A to A6.1, wherein the webpage includes a HEAD section, and the method includes the step of:

storing in the memory a HEAD item comprising data corresponding to the current state of at least one property of the HEAD section of the webpage.

A7.1. The method of paragraph A7, including the steps of:

after all items in the queue have been retrieved from the memory, retrieving the HEAD item from the memory;

comparing the data of the HEAD item with the current state of the at least one property for the HEAD section of the webpage; and storing any changes to the HEAD item identified in the comparing step in the memory.

A8. The method of any of paragraphs A to A7.1, including the step of:

identifying an asset in the webpage that is obtained by the webpage from another network location; and storing location data corresponding to said network location in the memory.

A9. The method of any of paragraphs A to A8, including the steps of:

detecting at least one of a user input corresponding to a change in the position of a mouse pointer and a keystroke; and storing a record of the user input in the memory.

B. A method of initiating recording of a session of user interaction with a website for subsequent replay, comprising sending instructions to a computer to cause it to carry out the method of any of paragraphs A to A9.

C. A non-transitory recording medium storing computer interpretable instructions for causing a processor to perform the method in accordance with paragraph B.

D. A method of recreating a session of user interaction with a website, comprising executing on a computer having a processor and memory the steps of:

retrieving the batches transmitted by a computer carrying out the method of paragraph A5.3;

storing the batches in the memory; and processing the batches with the processor to recreate the session for replay on a display device.

E. A non-transitory recording medium storing computer interpretable instructions for causing a processor to perform the method in accordance with paragraph D.

F. A computing device comprising a memory device including computer interpretable instructions that, when executed, direct a computing device to perform the method of any of paragraphs A to A9, and a processing device.

G. A computing device comprising a memory device including computer interpretable instructions that, when executed, direct a computing device to perform the method of paragraph D, and a processing device.

Although the embodiments according to the present disclosure described with reference to the drawings comprise processes performed by a processing arrangement, the present disclosure also extends to computer programs comprising instructions for causing a processing arrangement or a computer to perform the processes. More particularly, computer programs on or in a non-transitory recording medium, adapted for putting the invention into practice are encompassed by the present disclosure. The program may be in the form of source code, object code, a code intermediate source and object code such as in partially compiled form, or in any other form suitable for use in the implementation of the processes according to the present disclosure. The recording medium may be any entity or device capable of carrying the program.

For example, the recording medium may comprise a storage medium, such as a ROM, for example a CD ROM or a semiconductor ROM, or a magnetic recording medium, for example a floppy disc or hard disk. Alternatively, the carrier may be an integrated circuit in which the program is embedded, the integrated circuit being adapted for performing, or for use in the performance of, the relevant processes.

Thus, the present disclosure provides a computer program comprising program instructions for causing a processor to perform the methods described herein. Furthermore it includes provision of such a computer program on a recording medium, embodied in a record medium, stored in a computer electronic memory, or embodied in a read-only electronic memory.

Aspects of the present disclosure may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects. Furthermore, aspects of the present disclosure may take the form of a computer program product embodied in a computer-readable medium (or media) having computer readable program code/instructions embodied thereon.

Aspects of the present disclosure are described with reference to flowchart illustrations and/or block diagrams of methods, apparatuses, systems, and/or computer program products according to aspects of the present disclosure. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

The invention claimed is:

1. A method for recording a session of user interaction with a website for subsequent replay, comprising executing on a computer having a processor and memory the steps of:
   (a) receiving in the memory a webpage from the website;
   (b) detecting changes to the webpage by a process comprising the steps of:
      (i) creating a queue of items with the processor, wherein each item in the queue corresponds to an element of the webpage that is to be monitored for changes during execution of the process, wherein each item in the queue comprises data corresponding to the current state of at least one property for the respective element of the webpage that is to be monitored for changes during execution of the process, and wherein the step of creating a queue excludes elements of the webpage that are below a predetermined level in a structure of the webpage;
      (ii) storing the queue in the memory;
      (iii) retrieving each item of the queue in turn from the memory; and
      (iv) comparing the data of the item from the queue with the current state within the webpage of the at least one property for the respective element to identify if the data has changed in the current state within the webpage; and
   (c) storing any changes to the element identified in the comparing step in the memory.

2. The method of claim 1, further comprising executing on the computer the steps of:
   creating a record of the webpage as initially rendered for display on a display device by the computer; and
   storing the record in the memory.

3. The method of claim 1, wherein the predetermined level corresponds to a level of an input field in the webpage.

4. The method of claim 1, further comprising executing on the computer the step of:
   creating a record of elements below the predetermined level as rendered on a display screen of the computer.

5. The method of claim 1, wherein the at least one property comprises whether the element of the webpage is visible to a user according to its current state.

6. The method of claim 1, wherein the at least one property comprises the location of the element in the webpage.

7. The method of claim 6, wherein the location of the element is in the form of an xpath statement.

8. The method of claim 1, wherein the changes are stored in a cache of a browser being used to view the webpage.

9. The method of claim 1, further comprising executing on the computer the step of:
storing a parameter in association with each change, which parameter is dependent on the time elapsed between the start of the session and the time at which the change was identified.

10. The method of claim 1, further comprising executing on the computer the steps of:
retrieving from the memory and outputting from the processor a batch of the stored changes to elements;
transmitting the batch to a remote computer; and
outputting after a delay time a next batch for transmission to the remote computer.

11. A method of recording a session of user interaction with a website and recreating the session,
wherein the recording the session comprises executing on a first computer having a first processor and a first memory the steps of:
(a) receiving in the memory a webpage from the website;
(b) detecting changes to the webpage by a process comprising the steps of:
(i) creating a queue of items with the processor, wherein each item in the queue corresponds to an element of the webpage that is to be monitored for changes during execution of the process, wherein each item in the queue comprises data corresponding to the current state of at least one property for the respective element of the webpage that is to be monitored for changes during execution of the process, and wherein the step of creating a queue excludes elements of the webpage that are below a predetermined level in a structure of the webpage;
(ii) storing the queue in the memory;
(iii) retrieving each item of the queue in turn from the memory; and
(iv) comparing the data of the item from the queue with the current state within the webpage of the at least one property for the respective element to identify if the data has changed in the current state within the webpage; and
(c) storing any changes to the element identified in the comparing step in the memory; and
wherein the recreating the session comprises executing on a second computer having a second processor and a second memory the steps of:
retrieving batches of data generated as a result of the first computer recording the session;
storing the batches in the second memory; and
processing the batches with the second processor to recreate the session for replay on a display device.

12. The method of claim 1, further comprising executing on the computer the steps of:
identifying a new element in the webpage which does not have a corresponding item in the queue;
creating a new item corresponding to the new element;
adding the new item to the queue; and
creating a record of the new element as rendered on a display screen of the computer.

13. The method of claim 12, further comprising executing on the computer the steps of:
identifying a child element associated with the new element; and
adding an item corresponding to the child element to the queue.

14. The method of claim 1, wherein the webpage includes a HEAD section, and the method further comprises executing on the computer the step of:
storing in the memory a HEAD item comprising data corresponding to the current state of at least one property of the HEAD section of the webpage.

15. The method of claim 14, further comprising executing on the computer the steps of:
after all items in the queue have been retrieved from the memory, retrieving the HEAD item from the memory;
comparing the data of the HEAD item with the current state of the at least one property for the HEAD section of the webpage; and
storing any changes to the HEAD item identified in the comparing step in the memory.

16. The method of claim 1, further comprising executing on the computer the steps of:
identifying an asset in the webpage that is obtained by the webpage from another network location; and
storing location data corresponding to said network location in the memory.

17. The method of claim 1, further comprising executing on the computer the steps of:
detecting at least one of a user input corresponding to a change in the position of a mouse pointer and a keystroke; and
storing a record of the user input in the memory.

18. A computing device comprising a processing device and a memory device including computer interpretable instructions that, when executed, direct a computing device to:
(a) receive in the memory device a webpage from the website;
(b) detect changes to the webpage by a process comprising the steps of:
(i) creating a queue of items with the processor, wherein each item in the queue corresponds to an element of the webpage that is to be monitored for changes during execution of the process, wherein each item in the queue comprises data corresponding to the current state of at least one property for the respective element of the webpage that is to be monitored for changes during execution of the process, and wherein the step of creating a queue excludes elements of the webpage that are below a predetermined level in a structure of the webpage;
(ii) storing the queue in the memory device;
(iii) retrieving each item of the queue in turn from the memory device; and
(iv) comparing the data of the item from the queue with the current state within the webpage of the at least one property for the respective element to identify if the data has chanted in the current state within the webpage; and
(c) storing any changes to the element identified in the comparing step in the memory device.

19. The method of claim 1, wherein the queue is an item queue, and wherein the changes to the element identified in the comparing step are stored in an event queue distinct from the item queue.

20. A method for recording a session of user interaction with a website for subsequent replay, comprising executing on a computer having a processor and memory the steps of:
(a) receiving in the memory a webpage from the website;
(b) detecting changes to the webpage by a process comprising the steps of:
  (i) creating a queue of items with the processor, wherein each item in the queue of items:
    corresponds to a respective element of the webpage that is to be monitored for changes during execution of the process, and
    comprises data corresponding to the current state of at least one property for the respective element of the webpage that is to be monitored for changes during execution of the process;
    wherein the step of creating a queue excludes elements of the webpage that are below a predetermined level in a structure of the webpage;
  (ii) storing the queue in the memory; and
  (iii) recording, based on the queue, changes to the elements of the webpage, wherein the recording comprises:
    retrieving each item of the queue in turn from the memory; and
    comparing, based on the retrieving and for each item of the queue in turn, the data of a corresponding item from the queue with the current state within the webpage of the at least one property for the respective element to identify if the data has changed in the current state within the webpage; and
(c) storing any changes to the element identified in the comparing step in the memory.

21. The method of claim 20, further comprising executing on the computer the step of:
performing one or more other operations associated with the website;
wherein the recording changes to the elements of the webpage for individual elements is interleaved with the one or more other operations.

22. A method for recording a session of user interaction with a website for subsequent replay, comprising executing on a computer having a processor and memory the steps of:
(a) receiving in the memory a webpage from the website, wherein the webpage includes a HEAD section;
(b) detecting changes to the webpage by a process comprising the steps of:
  (i) creating a queue of items with the processor, wherein each item in the queue corresponds to an element of the webpage that is to be monitored for changes during execution of the process, and wherein each item in the queue comprises data corresponding to the current state of at least one property for the respective element of the webpage that is to be monitored for changes during execution of the process;
  (ii) storing the queue in the memory;
  (iii) retrieving each item of the queue in turn from the memory; and
  (iv) comparing the data of the item from the queue with the current state within the webpage of the at least one property for the respective element to identify if the data has changed in the current state within the webpage;
(c) storing any changes to the element identified in the comparing step in the memory;
(d) storing in the memory a HEAD item comprising data corresponding to the current state of at least one property of the HEAD section of the webpage;
(e) after all items in the queue have been retrieved from the memory, retrieving the HEAD item from the memory;
(f) comparing the data of the HEAD item with the current state of the at least one property for the HEAD section of the webpage; and
(g) storing any changes to the HEAD item identified in the comparing step in the memory.

* * * * *